Patented Aug. 31, 1954

2,687,980

UNITED STATES PATENT OFFICE 2,687,980

THROMBOPLASTIN PRODUCT AND METHOD FOR PREPARING SAME

Ernest W. Blanchard, Ramsey, N. J., and Clifford F. Gerber, New Hyde Park, N. Y.

No Drawing. Application September 15, 1948, Serial No. 49,458

6 Claims. (Cl. 167—74)

This invention relates to the preparation of a stable solution of thromboplastin useful in determining the prothrombin time or activity of blood.

As is known, prothrombin determinations are useful in the diagnosis of hemorrhagic diatheses. For example, in the prophylaxis and treatment of thrombosis in human beings with drugs like dicumarol [3,3' - methylenebis - (4 - hydroxycoumarin)] it is necessary to keep under careful and constant observation the prothrombin time or activity of the patient's blood to guard against hemorrhage. Several procedures for determining prothrombin time are available, involving the use of thromboplastin preparations. One of the great drawbacks of these procedures has been the lack of a standard, stable thromboplastin, the material heretofore in use exhibiting loss of activity within the space of a few days or less, even while under refrigeration. This has necessitated, as one result, very frequent preparation of thromboplastin solutions to insure reproducible thromboplastic activity. As mentioned, refrigeration of thromboplastin preparations has been resorted to without, however, producing uniformly stable material.

According to this invention, stable thromboplastin material is provided which retains its stability over a period of months under ordinary conditions of storage, i. e., storage in an ordinary container at room temperature, say 75° F. Briefly, the stable thromboplastin is provided in the form of a saline extract of fresh thromboplastin-containing animal tissue and has a pH of about 6.5 to about 7.0. The extract also contains about 0.5 to about 1.0% by weight of phenol, the latter having been initially present in the saline solution, i. e., prior to extraction of the animal tissue.

The foregoing saline solution of thromboplastin is prepared from fresh, whole mammalian tissue such as the brain and/or lung or other tissue of the rabbit, horse, rat, hog, or cattle. The tissue may be a single kind of tissue or a combination of two different tissues, and as will be seen, special advantages result from combinations of two different tissues. The tissue is first ground, and then several volumes of a previously prepared physiological saline solution containing about 0.5 to about 1.0% by weight of phenol are added thereto and the resulting mixture is finely dispersed. The mixture is allowed to stand for a time to permit the saline solution to extract the thromboplastin from the tissue. Thereafter the tissue residue is separated from the liquid as by filtration or centrifuging, the solids rejected, and the liquid recovered as a stable thromboplastin solution. Further purification may be accomplished, if desired, by the usual methods utilized in the purification of tissue extracts, such as, for example, alternate freezing and thawing, isoelectric precipitation, treatment with adsorbents, settling, etc.

To insure uniformly reliable and satisfactory results, the above described solution and method must satisfy several important requirements, as follows: It is essential to employ fresh animal tissue. Dried tissue, produced by dehydrating with solvents or by freezing techniques or in other ways, will not lead to a stable solution of thromboplastin. By "fresh" is meant an unpreserved animal tissue, i. e., containing no preservative agents. Practically speaking, fresh tissue comprises material used, or placed under refrigeration, within a couple of hours after the animal has been killed.

It is also essential that the phenol concentration of the thromboplastin solution shall lie in the range of about 0.5 to about 1.0% by weight. A phenol concentration below about 0.5% by weight is not sufficient to prevent contamination of the solution by bacteria, and as a result of bacterial growth the activity of the thromboplastin will generally be impaired. If the concentration of phenol is above about 1% by weight, the thromboplastin tends to be destroyed due to chemical attack by the phenol itself. A preferred concentration is 1%. Example 2 below illustrates the variation in results following the use of different phenol concentrations.

A further requirement for producing a stable solution of thromboplastin according to the invention lies in the order of addition of phenol to the saline solution. As indicated above, the phenol must be added to the saline prior to the extraction of the thromboplastin from the animal tissue. If the phenol is added to the solution following the extraction, the resulting solution of thromboplastin will not be stable.

Finally, it is essential that the thromboplastin solution shall have a pH in the range of about 6.5 to about 7.0. Deterioration of the thromboplastin tends to occur above a pH of about 7.0 while below a pH of about 6.5 precipitation of active material takes place. Also, at a low pH interference with the clotting mechanism may result. Buffering of the thromboplastin solution may be resorted to, if necessary, to maintain the pH within the foregoing range, although the solutions produced according to the invention generally have a pH of 6.5 to 6.8 without the use of a buffer. Where buffering is employed, any suitable buffer agent may be employed, such, for example, as sodium caprylate, sodium maleate, imidazole, veronal, etc. A preferred pH for the solution is pH 6.8.

The quantity of the saline solution that is employed relative to the quantity of animal tissue is not critical. Preferably, about 5 volumes of saline per weight of tissue is generally used, although the quantity of saline may be as low as about 1 volume and as high as about 10 volumes per weight of tissue.

The following examples may illustrate the invention.

*Example 1*

Fifty grams of ground fresh horse lung were mixed with 250 cc. of saline containing 1.0% by weight of phenol. The resulting mixture was then finely dispersed, as by means of a Waring blender, and left to stand for about 2 hours. It was filtered through cheese cloth, the filtrate recovered, and labeled A. A second solution, labeled B, was prepared in the same way except that fresh horse brain was used. A third solution prepared from fresh rabbit brain was labeled C. Then two additional solutions: D and E, were prepared according to the foregoing method except that dried tissues, i. e., acetone-dried rabbit brain and lyophilized rabbit lung, were used. Prothrombin time determinations were then made on samples of human plasma using the foregoing solutions and following the method of Quick, A. J., J. A. M. A. 110 1658 (1938). These prothrombin times are reported below as initial times. After varying intervals, indicated below as elapsed time, final prothrombin times were determined with the same solutions. During the interval between the initial and final prothrombin times the solutions were stored in ordinary screw-capped containers at room temperature. The data follow:

| Sample | Tissue | Prothrombin Time, sec. | | Elapsed Time, Days |
|---|---|---|---|---|
| | | Initial | Final | |
| A | Horse Lung | 20 | 22 | 71 |
| B | Horse Brain | 20 | 20 | 35 |
| C | Rabbit Brain | 14 | 16 | 21 |
| D | ----do---- | 23 | >120 | 8 |
| E | Rabbit Lung | 21 | 94 | 35 |

It will be recalled in this connection that with active thromboplastin as conventionally employed, the prothrombin times of normal plasma are in a range of about 12 to about 20 seconds. By relation with this standard it will be seen from the foregoing table that all of the thromboplastin solutions yielded acceptable initial prothrombin times. In the case of the solutions made from fresh tissue, the prothrombin time was still acceptable after the indicated elapsed time. However, the solutions made from dried tissue, D and E, proved to be unstable, as evidenced by the greatly increased prothrombin time after the indicated elapsed time.

*Example 2*

Five samples (F, G, H, J, and K) of thromboplastin were prepared from a single sample of horse lung in a manner similar to that of Example 1. The samples differed only in their phenol concentration, which was, respectively, 0%, 0.5%, 1.0%, 1.5%, and 2.0% by weight. Initial prothrombin times were determined as described in Example 1, and after the solutions had stood over night at room temperature, final prothrombin times were determined. The results are as follows:

| Sample | Concentration of Phenol, percent by wt. | Prothrombin Time, sec. | |
|---|---|---|---|
| | | Initial | Final |
| F | 0 | 18 | 42 |
| G | 0.5 | 12 | 13 |
| H | 1.0 | 12 | 13 |
| J | 1.5 | 14 | 21 |
| K | 2.0 | 16 | 55 |

The above data show quite clearly that a phenol concentration between about 0.5 and about 1.0% by weight is critical because both at 0 and at 1.5% and higher the increase in prothrombin time, even within the short space of 24 hours, is greatly prolonged.

As indicated above, it has further been found that thromboplastin solutions, produced according to the invention, and containing thromboplastin from two kinds of tissue, say brain and lung tissue, exhibit marked potentiation. The effect is evidenced by a shorter initial prothrombin time by comparison with the time exhibited by a solution containing thromboplastin from only one of such tissues. This effect is apparent whether the two tissues are mixed and extracted simultaneously or whether each tissue is extracted separately and the extracts afterwards combined. The following example may illustrate this effect:

*Example 3*

Two thromboplastin solutions, N and O, were prepared as described in Example 1, using brain-lung mixtures of horse tissue in the proportions of 50 : 50 and 30 : 70, brain to lung, respectively. Two other solutions, L and M, were prepared, L from the brain and M from the lung, of the same animal used for preparing solutions N and O. A sample R was then made according to Example 1, using a 50 : 50 brain-lung mixture of a rabbit. At the same time two additional samples, P and Q, were prepared, P from the brain and Q from the lung of the same rabbit. Prothrombin times were determined with all these solutions by the method cited in Example 1. The results are tabulated below:

| Sample | Tissue | Prothrombin time, sec. | | Elapsed time, days |
|---|---|---|---|---|
| | | Initial | Final | |
| L | Horse brain | 20 | 22 | 18 |
| M | Horse lung | 18 | 19 | 7 |
| N | Horse brain-lung, 50:50 | 15 | 17 | 21 |
| O | Horse brain-lung, 30:70 | 17 | 16 | 21 |
| P | Rabbit brain | 14 | 16 | 21 |
| Q | Rabbit lung | 13 | 17 | 21 |
| R | Rabbit brain-lung, 50:50 | 10 | 12 | 28 |

If the prothrombin times of the brain-lung mixtures: N and O are compared with the prothrombin times for the individual tissues: L and M, and similarly if R is compared with P and Q, it will be seen that in every case a shorter prothrombin time is obtained with the tissue mixtures than with any constituent thereof.

In the light of the foregoing description, the following is claimed:

1. Process for preparing stable thromboplastin in saline solution which comprises adding to a saline solution about 0.5 to about 1% by weight of phenol, extracting ground fresh thromboplastin-containing animal tissue with said saline-phenol solution, then separating the tissue residue from the remaining liquid, recovering the liquid, and maintaining the pH of the liquid in the range of about 6.5 to 7.0.

2. Process according to claim 1 in which brain tissue is extracted.

3. Process according to claim 1 in which lung tissue is extracted.

4. A stable solution of thromboplastin prepared from a mixture of fresh thromboplastin-containing brain and lung animal tissue by extraction of the mixture with an aqueous phenol-containing saline solution, said phenol comprising 0.5 to 1% by weight of said thromboplastin solution, and said thromboplastin solution having a pH of about 6.5 to about 7.0 and being stable at room temperatures for at least a month.

5. Process for preparing stable thromboplastin solution which comprises adding to a saline solution 0.5 to 1 per cent by weight of phenol, extracting a mixture of fresh thromboplastin-containing brain and lung animal tissue with said saline-phenol solution, then separating the tissue residue from the remaining liquid, recovering the liquid, and maintaining the pH of the liquid in the range of about 6.5 to 7.0.

6. Process according to claim 5 in which a mixture of fresh horse brain and lung tissue is extracted.

References Cited in the file of this patent

UNITED STATES PATENTS

| Number | Name | Date |
|---|---|---|
| 1,437,951 | Archibald | Dec. 5, 1922 |
| 1,695,612 | Schröder | Dec. 18, 1928 |
| 1,968,156 | Lautenschlager | July 31, 1934 |
| 2,516,216 | Kazal | July 25, 1950 |

OTHER REFERENCES

Seegers in J. Biol. Chem., Nov. 1938, pp. 91, 92.

Edsall in J. Clin. Invest., July 1944, pp. 557–565, pp. 561, 562 especially relied on.

Quick, "The Hemorrhagic Diseases," 1942, pp. 64, 65.